(12) United States Patent
Jong et al.

(10) Patent No.: US 11,594,956 B2
(45) Date of Patent: *Feb. 28, 2023

(54) DUAL-PHASE HYBRID CONVERTER

(71) Applicant: Analog Devices, Inc., Wilmington, MA (US)

(72) Inventors: Owen Jong, San Jose, CA (US); Ya Liu, Sunnyvale, CA (US); Yingyi Yan, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,065

(22) Filed: Jan. 19, 2021

(65) Prior Publication Data
US 2022/0231600 A1 Jul. 21, 2022

(51) Int. Cl.
*H02M 3/07* (2006.01)
(52) U.S. Cl.
CPC .................... *H02M 3/07* (2013.01)
(58) Field of Classification Search
CPC ....................................... H02M 3/07
See application file for complete search history.

(56) References Cited

U.S. PATENT DOCUMENTS

| | | | |
|---|---|---|---|
| 6,903,536 B2 | 6/2005 | Yang | |
| 7,230,405 B2 | 6/2007 | Jang et al. | |
| 7,733,072 B2 | 6/2010 | Kanakubo | |
| 7,746,041 B2 | 6/2010 | Xu et al. | |
| 7,782,027 B2 | 8/2010 | Williams | |
| 7,952,337 B2 | 5/2011 | Gurcan | |
| 7,969,129 B2 | 6/2011 | Kudo | |
| 8,854,019 B1 | 10/2014 | Levesque et al. | |
| 9,024,600 B2 | 5/2015 | Wiktor et al. | |

(Continued)

FOREIGN PATENT DOCUMENTS

| CN | 103280974 B | 9/2015 |
|---|---|---|
| CN | 108462394 A | 8/2018 |

(Continued)

OTHER PUBLICATIONS

"LTC7821: Hybrid Step-Down Synchronous Controller", Analog Devices Data Sheet, (Apr. 2018), 36 pgs.

(Continued)

*Primary Examiner* — Sibin Chen
(74) *Attorney, Agent, or Firm* — Schwegman Lundberg & Woessner, P.A.

(57) ABSTRACT

A dual-phase hybrid DC-DC converter using a switched-capacitor technique is described. The dual-phase hybrid converter can reduce the volt-seconds on the inductors of the converter, which can allow for a reduction in the size of the inductors. In addition, the dual-phase hybrid converter can utilize inductors as current sources to charge and discharge the flying capacitors, which can reduce the size of the mid capacitor and increase solution density. Because charging and discharging are performed by inductors, the dual-phase hybrid converter can eliminate the capacitor-to-capacitor charge transfer. As such, the dual-phase hybrid converter does not need high capacitance to achieve high efficiency operation, which can further increase solution density.

20 Claims, 8 Drawing Sheets

(56) References Cited

U.S. PATENT DOCUMENTS

| | | | |
|---|---|---|---|
| 9,136,756 | B2 | 9/2015 | Liu |
| 9,295,116 | B2 | 3/2016 | Sanders et al. |
| 9,362,832 | B2 | 6/2016 | Karlsson et al. |
| 9,484,799 | B2 | 11/2016 | Zhang et al. |
| 9,600,062 | B2 | 3/2017 | Kumar |
| 9,653,996 | B2 | 5/2017 | Parto et al. |
| 9,793,794 | B2 | 10/2017 | Stauth et al. |
| 9,966,842 | B1* | 5/2018 | Jiang .................. G05F 1/565 |
| 10,063,147 | B2 | 8/2018 | Hoyerby |
| 10,075,073 | B2 | 9/2018 | Guan et al. |
| 10,498,236 | B2 | 12/2019 | Liu et al. |
| 10,505,445 | B2 | 12/2019 | Oh |
| 10,541,623 | B1 | 1/2020 | Michal |
| 10,547,241 | B1* | 1/2020 | Li ....................... H02M 3/1588 |
| 10,601,324 | B1* | 3/2020 | Kudva ................ H02M 3/1588 |
| 10,615,697 | B1 | 4/2020 | Ferrari et al. |
| 10,698,430 | B2 | 6/2020 | Thenus et al. |
| 10,756,624 | B2 | 8/2020 | Mauri |
| 10,833,661 | B1 | 11/2020 | Archibald et al. |
| 2006/0103364 | A1 | 5/2006 | Adragna et al. |
| 2008/0247194 | A1* | 10/2008 | Ying .................. H02M 3/3376 363/21.02 |
| 2014/0346962 | A1 | 11/2014 | Sanders et al. |
| 2015/0062108 | A1 | 3/2015 | Archibald |
| 2016/0336855 | A1 | 11/2016 | Ozanoglu et al. |
| 2017/0085183 | A1 | 3/2017 | Notsch |
| 2017/0201177 | A1 | 7/2017 | Kesarwani et al. |
| 2018/0294717 | A1 | 10/2018 | Zhang et al. |
| 2019/0348913 | A1 | 11/2019 | Zhang et al. |
| 2020/0091817 | A1 | 3/2020 | Teplechuk et al. |
| 2020/0212795 | A1* | 7/2020 | Das .................... H02M 3/158 |
| 2020/0259418 | A1 | 8/2020 | Higaki et al. |
| 2020/0321860 | A1 | 10/2020 | Amin et al. |
| 2021/0083573 | A1 | 3/2021 | Yen et al. |
| 2021/0184586 | A1 | 6/2021 | Jin et al. |
| 2022/0029540 | A1 | 1/2022 | Zhang et al. |
| 2022/0231601 | A1 | 7/2022 | Jong et al. |
| 2022/0231618 | A1 | 7/2022 | Yan et al. |

FOREIGN PATENT DOCUMENTS

| | | |
|---|---|---|
| CN | 108574411 A | 9/2018 |
| CN | 109004832 A | 12/2018 |
| CN | 109728718 A | 5/2019 |
| CN | 110224599 A | 9/2019 |
| CN | 110545039 A | 12/2019 |
| CN | 110581667 A | 12/2019 |
| CN | 110649814 A | 1/2020 |
| CN | 114825911 A | 7/2022 |
| CN | 114825926 A | 7/2022 |
| EP | 3734825 A1 | 11/2020 |
| FR | 2996698 A1 | 4/2014 |
| JP | 5937442 B2 | 5/2016 |
| JP | 6394030 B2 | 9/2018 |
| KR | 101710537 B1 | 3/2017 |
| TW | 200608678 A | 3/2006 |
| TW | 201810908 A | 3/2018 |
| WO | WO-2020112207 A2 | 6/2020 |

OTHER PUBLICATIONS

Carvalho, Samuel da Silva, "Digital PWM for Multi-Level Flying Capacitor Converters with Improved Output Resolution and Flying Capacitor Voltage Controller Stability", IEEE 19th Workshop on Control and Modeling for Power Electronics (COMPEL), (2018), 7 pgs.
Lang, Bastian, "Solving the Power Density Challenge", Bodo's Power Systems, (Mar. 2020), 2 pgs.
Seo, Gabu-Su, "A 95%-Efficient 48V-to-1V 10A VRM Hybrid Converter Using Interleaved Dual Inductors", 2018 IEEE Energy Conversion Congress and Exposition (ECCE), pp. 3825-3830, (Oct. 7, 2018), 6 pgs.
"U.S. Appl. No. 17/248,289, Non Final Office Action dated Jun. 9, 2022", 14 pgs.
"European Application Serial No. 21215788.7, Extended European Search Report dated Jun. 7, 2022", 11 pgs.
Halamicek, Michael, et al., "Cross-Coupled Series-Capacitor Quadruple Step-Down Buck Converter", IEEE Applied Power Electronics Conference and Exposition (APEC), IEEE, (Mar. 15, 2020), 1-6.
Li, Cheng, et al., "A Novel Hybrid 4:1 Step Down Converter Using an Autotransformer with DC Winding Current", IEEE Energy Conversion Congress and Exposition (ECCE), IEEE, (Oct. 11, 2020), 173-180.
Wang, Chuang, et al., "A Two-Phase Three-Level Buck DC-DC Converter With X-Connected Flying Capacitors for Current Balancing", IEEE Solid-State Circuits Letters, IEEE, vol. 3, (Sep. 22, 2020), 442-445.
Amin, Sally Safwat, et al., "A Fully Integrated Li-Ion-Compatible Hybrid Four-Level DC-DC Converter in 28-nm FDSOI", IEEE Journal of Solid-Slate Circuits, 54(3), (Mar. 2019), 720-732.
Carvalho, Samuel de Silva, et al., "A Low-Volume Multi-Phase Interleaved Dc-Dc Converter for High Step-Down Applications with Auto-Balancing of Phase Currents", IEEE Applied Power Electronics Conference and Exposition (APEC), (2017), 142-148.
Lei, Yutian, et al., "An Analytical Method to Evaluate Flying Capacitor Multilevel Converters and Hybrid Switched-Capacitor Converters for Large Voltage Conversion Ratios", IEEE 16th Workshop on Control and Modeling for Power Electronics (COMPEL), (2015), 7 pgs.
Saggini, Stefano, et al., "A 99 Percent Efficient Dual-Phase Resonant Switched-Capacitor-Buck Converter for 48 V Data Center Bus Conversions", IEEE Applied Power Electronics Conference and Exposition (APEC), (2019), 482-487.
"U.S. Appl. No. 17/248,289, Notice of Allowance dated Sep. 21, 2022", 11 pgs.
"U.S. Appl. No. 17/248,289, Response filed Sep. 6, 2022 to Non Final Office Action dated Jun. 9, 2022", 10 pgs.
"U.S. Appl. No. 17/375,830, Non Final Office Action dated Jul. 21, 2022", 28 pgs.
"European Application Serial No. 21215787.9, Extended European Search Report dated Jun. 9, 2022", 8 pgs.
"Taiwanese Application Serial No. 111101218, Office Action dated Sep. 5, 2022", W/O English Translation, 9 pgs.
"U.S. Appl. No. 17/375,830, Final Office Action dated Oct. 31, 2022", 27 pgs.
"U.S. Appl. No. 17/248,289, Supplemental Notice of Allowability dated Oct. 13, 2022", 3 pgs.
"U.S. Appl. No. 17/375,830, Response filed Oct. 18, 2022 to Non Final Office Action dated Jul. 21, 2022", 18 pgs.
"European Application Serial No. 21215788.7, Response filed Jan. 5, 2023 to Extended European Search Report dated Jun. 7, 2022", 19 pgs.
"U.S. Appl. No. 17/248,289, Supplemental Notice of Allowability dated Nov. 23, 2022", 3 pgs.
"U.S. Appl. No. 17/375,830, Advisory Action dated Nov. 28, 2022", 2 pgs.
"U.S. Appl. No. 17/375,830, Response filed Nov. 14, 2022 to Final Office Action dated Oct. 31, 2022", 12 pgs.
"U.S. Appl. No. 17/375,830, Response filed Dec. 20, 2022 to Advisory Action dated Nov. 28, 2022", 12 pgs.
"European Application Serial No. 21215787.9, Response filed Dec. 14, 2022 to Extended European Search Report dated Jun. 9, 2022", 18 pgs.
"Taiwanese Application Serial No. 111101219, Office Action dated Nov. 2, 2022", W/O English Translation, 5 pgs.

* cited by examiner

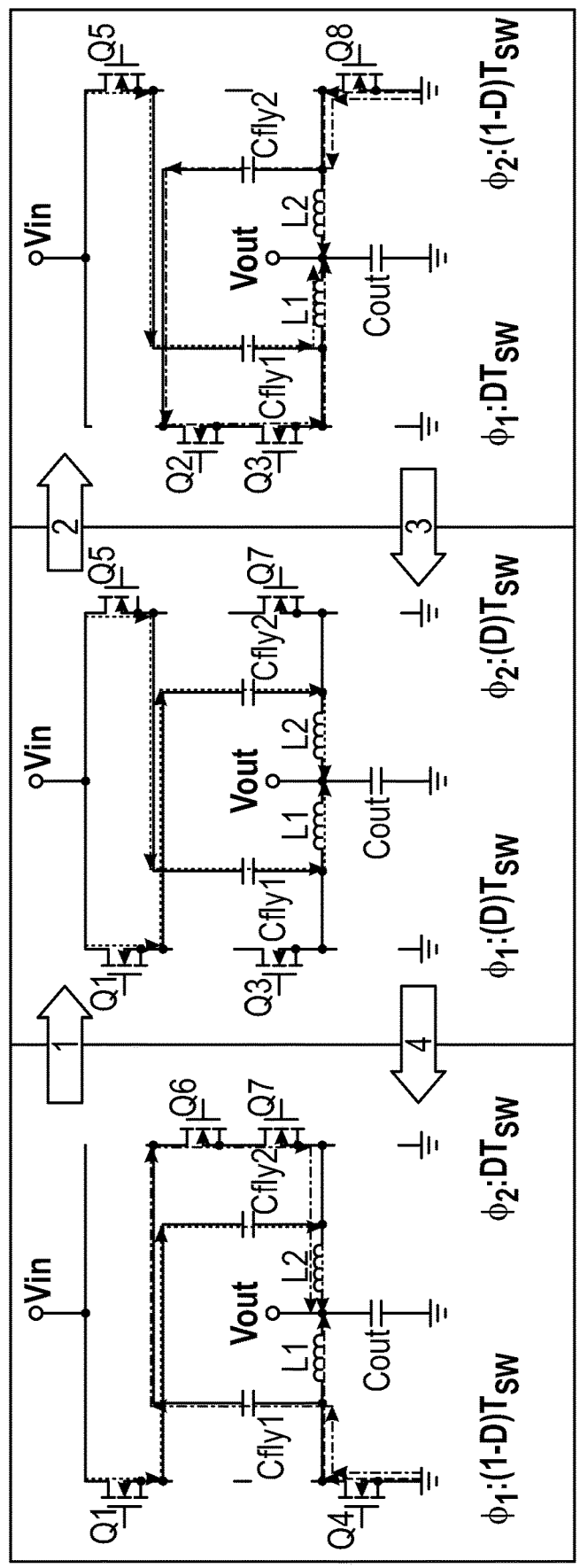

DUAL-PHASE HYBRID CONVERTER

FIELD OF THE DISCLOSURE

This document pertains generally, but not by way of limitation, to power converter circuits.

BACKGROUND

Hybrid power converter circuits provide efficient power solutions for power supply design. A hybrid power converter circuit is a type of power converter that provides direct current to direct current (DC-DC) voltage conversion based on switched capacitor converters and inductor-based converters. A hybrid power converter contains one or more switching elements (e.g., one or more transistors) and reactive elements (e.g., capacitors and inductors) that, in connection with a periodic switching of the switching elements provides DC output voltage.

SUMMARY OF THE DISCLOSURE

This disclosure describes a dual-phase hybrid DC-DC converter circuit topology (also referred to as a "dual-phase hybrid converter" in this disclosure) using a switched-capacitor technique. The dual-phase hybrid converter of this disclosure can reduce the volt-seconds on the inductors of the converter, which can allow for a reduction in the size of the inductors. In addition, the dual-phase hybrid converter can utilize inductors as current sources to charge and discharge the flying capacitors (similar to ideal lossless charge transfer), which can reduce the size of the mid capacitor and increase solution density. Because charging and discharging are performed by inductors, the dual-phase hybrid converter of this disclosure can eliminate the capacitor-to-capacitor charge transfer. As such, the dual-phase hybrid converter does not need high capacitance to achieve high efficiency operation, which can further increase solution density. Finally, by using an inventive gate driving technique, the dual-phase hybrid converter can operate at a higher duty cycle than other approaches.

In some aspects, this disclosure is directed to a dual-phase hybrid converter comprising: a first switched-capacitor circuit including a first switching element, a second switching element, and a first capacitor; a first switching converter circuit including a third switching element, a fourth switching element, and a first inductor, wherein the second switching element is coupled with the third switching element; a second switched-capacitor circuit including a fifth switching element, a sixth switching element, and a second capacitor; a second switching converter circuit including a seventh switching element, an eighth switching element, and a second inductor, wherein the sixth switching element is coupled with the seventh switching element; and a control circuit to control operation of the first switching converter circuit using a first timing phase and control operation of the second switching converter circuit using a second timing phase, wherein the first capacitor is connected between the first switched-capacitor circuit and the second switching converter circuit, and wherein the second capacitor is connected between the second switched-capacitor circuit and the first switching converter circuit.

In some aspects, this disclosure is directed to a method of operating a dual-phase hybrid converter, the method comprising: generating complementary first control signals to turn ON and OFF switching elements of a first switching converter circuit, wherein a first timing phase includes the complementary first control signals; generating complementary second control signals to turn ON and OFF switching elements of a second switching converter circuit, wherein a second timing phase includes the complementary second control signals; generating, using one of the complementary first control signals and one of the complementary second control signals, third control signals to turn ON and OFF switching elements of a first switched-capacitor circuit and a second switched-capacitor circuit; applying, according to a switching cycle having a switching frequency and a duty cycle, the complementary first control signals, the complementary second control signals, and the third control signals, the switching cycle including the first timing phase and the second timing phase; generating a series of pulses by the first switching converter circuit, the second switching converter circuit, the first switched-capacitor circuit, and the second switched-capacitor circuit, to at least one LC circuit including at least one capacitor and at least one inductor; adjusting the duty cycle of switching signals to adjust the series of pulses to set an output voltage across an output capacitor; and providing the output voltage across the output capacitor as an output voltage of the dual-phase hybrid converter.

In some aspects, this disclosure is directed to a dual-phase hybrid converter comprising: a first switched-capacitor circuit including a first switching element, a second switching element, and a first capacitor; a first switching converter circuit including a third switching element, a fourth switching element, and a first inductor, wherein the second switching element is coupled with the third switching element; a second switched-capacitor circuit including a fifth switching element, a sixth switching element, and a second capacitor; a second switching converter circuit including a seventh switching element, an eighth switching element, and a second inductor; wherein the sixth switching element is coupled with the seventh switching element; and a control circuit to control operation of the first switching converter circuit using a first timing phase and control operation of the second switching converter circuit using a second timing phase, the control circuit to: generate complementary first control signals to turn ON and OFF switching elements of the first switching converter circuit; generate complementary second control signals to turn ON and OFF switching elements of the second switching converter circuit; and generate, using one of the complementary first control signals and one of the complementary second control signals, third control signals to turn ON and OFF switching elements of a first switched-capacitor circuit and a second switched-capacitor circuit.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6A is a schematic diagram of an example of a first operating phase of the dual-phase hybrid converter of FIG. 1 for a duty cycle greater than 50%.

FIG. 6B is a schematic diagram of an example of a second operating phase of the dual-phase hybrid convener of FIG. 1 for a duty cycle greater than 50%.

FIG. 6C is a schematic diagram of an example of a third operating phase of the dual-phase hybrid converter of FIG. 1 for a duty cycle greater than 50%.

DETAILED DESCRIPTION

This disclosure describes a dual-phase hybrid DC-DC converter circuit topology (also referred to as a "dual-phase hybrid converter" in this disclosure) using a switched-capacitor technique. The dual-phase hybrid converter of this disclosure can reduce the volt-seconds on the inductors of the converter, which can allow for a reduction in the size of the inductors. In addition, the dual-phase hybrid converter can utilize inductors as current sources to charge and discharge the flying capacitors (similar to ideal lossless charge transfer), which can reduce the size of the mid capacitor and increase solution density. Because charging and discharging are performed by inductors, the dual-phase hybrid converter of this disclosure can eliminate the capacitor-to-capacitor charge transfer. As such, the dual-phase hybrid converter does not need high capacitance to achieve high efficiency operation, which can further increase solution density. Finally, by using an inventive gate driving technique, the dual-phase hybrid converter can operate at a higher duty cycle than other approaches.

The term "converter," as used in this disclosure, includes but is not limited to any one of, or any combination of "regulator," "DC regulator," "voltage regulator," "DC voltage regulator," "DC-DC converter," "DC converter" and "converter," and includes, but is not limited to, the plain meaning of any one or more of these terms.

Figure 1:
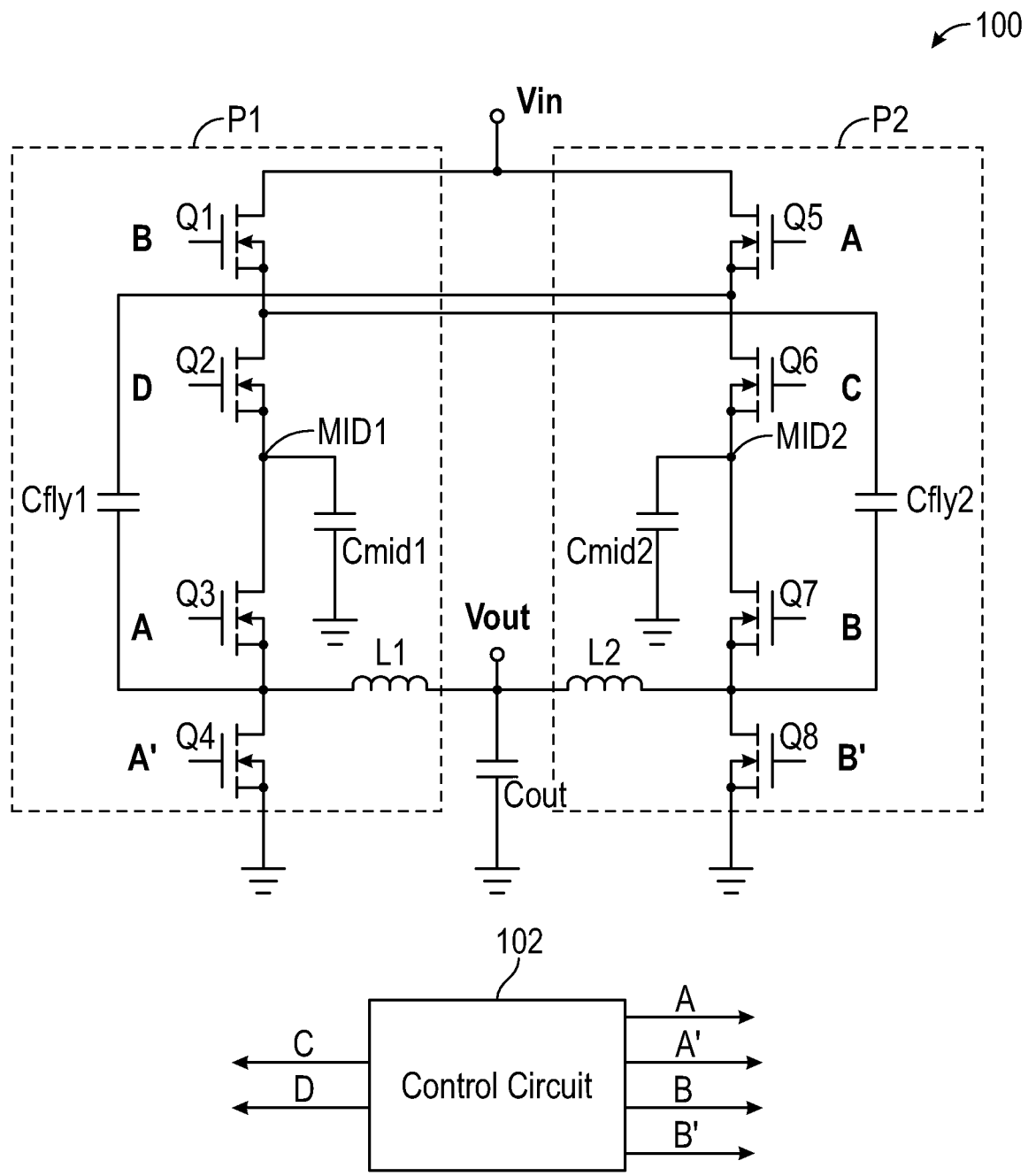
FIG. 1 is a schematic diagram of an example of a dual-phase hybrid convener.

FIG. 1 is a schematic diagram of an example of a dual-phase hybrid converter 100. The dual-phase hybrid converter 100 can include a first half power stage P1 including a first switching element $Q_1$, a second switching element $Q_2$, a third switching element $Q_3$, a fourth switching element $Q_4$, a first inductor $L_1$, and a first switched-capacitor $C_{fly1}$ (also referred to in this disclosure as a flying capacitor). The dual-phase hybrid converter 100 can further include a second half power stage P2 including a fifth switching element $Q_5$, a sixth switching element $Q_6$, a seventh switching element $Q_7$, an eighth switching element $Q_8$, a second inductor $L_2$, and a second switched-capacitor capacitor $C_{fly2}$ (also referred to in this disclosure as a flying capacitor). The switching elements of FIG. 1 can be transistors, e.g., power transistors.

In the example shown in FIG. 1, the first switching element $Q_1$ and the second switching element $Q_2$ are connected in series between the input voltage $V_{IN}$ and a first middle node MID1. The fifth switching element $Q_5$ and the sixth switching element $Q_6$ are connected in series between the input voltage $V_{IN}$ and a second middle node MID2.

The dual-phase hybrid converter 100 can provide regulation using at least one switched-capacitor circuit with at least one switching converter circuit, and thus is a hybrid converter. For example, the first half power stage P1 can include a first switched-converter circuit and a first switching converter circuit. The first switched-converter circuit can include the first switching element $Q_1$, the second switching element $Q_2$, and the first flying capacitor $C_{fly1}$, and a first switching converter circuit that includes the third switching element $Q_3$, the fourth switching element $Q_4$, and the first inductor $L_1$. As seen in FIG. 1, the second switching element $Q_2$ is coupled in series with the third switching element $Q_3$.

Similarly, the second half power stage P2 can include a second switched-converter circuit and a second switching converter circuit. The second switched-converter circuit can include the fifth switching element $Q_5$, the sixth switching element $Q_6$, and the second flying capacitor $C_{fly2}$, and a second switching converter circuit that includes the seventh switching element $Q_7$, the eighth switching element $Q_8$, and the second inductor $L_2$. The sixth switching element $Q_6$ is coupled in series with the seventh switching element $Q_7$.

As seen in FIG. 1, the flying capacitors $C_{fly1}$ and $C_{fly2}$ of the dual-phase hybrid converter 100 are cross-coupled. More particularly, the first flying capacitor ($C_{fly1}$) can be connected between the second switched-capacitor circuit and the first switching converter circuit, and the second flying capacitor $C_{fly2}$ can be connected between the first switched-capacitor circuit and the second switching converter circuit.

The dual-phase hybrid converter 100 can receive an input voltage $V_{IN}$ from an input terminal and provide an output voltage $V_O$ to an output terminal that is connected to an output capacitor $C_{OUT}$. In some examples, the output terminal of the dual-phase hybrid converter 100 can be coupled to any desired load. The dual-phase hybrid converter 100 can operate with a duty cycle "D" that changes in relation to a ratio of $2V_O/V_{IN}$ (duty cycle=D=$2V_O/V_{IN}$).

A control circuit 102 can output control signals to the corresponding control nodes of the switching elements, such as to the gate terminals of transistors, of the dual-phase hybrid converter 100. The control circuit 102 can include logic circuitry to generate control signals A, A', B, B', C, and D. The controls signals can be square wave signals, for example. In some examples, the control circuit 102 can control the frequency and duty cycle of the control signals.

In some examples, the control circuit 102 can include a pulse-width modulation (PWM) controller that generates PWM signals to power stages P1, P2 to turn the switching elements $Q_1$-$Q_8$ ON or OFF according to a switching frequency and/or duty cycle. The control circuit 102 can include an input/output (I/O) interface and can be programmed (e.g., before start-up of the converter) with a switching frequency and/or duty cycle, for example, by way of the interface.

As shown in FIG. 1, the first through eighth switching elements $Q_1$-$Q_8$ are controlled by control signals A, A', B, B', C and D, where A' is complementary control signal of A, and B' is complementary control signal of B. Because the example shown in FIG. 1 implements the switching element using n-type transistors (such as n-type field-effect transistors), when a given control signal is high, the corresponding switching element is ON. However, implementations using p-type transistors, n-type and p-type transistors, and/or other types of switches are also possible.

Figure 2:
FIG. 2 is a schematic diagram of an example of control logic circuitry for the dual-phase hybrid converter of FIG. 1.

An example of logic circuitry to generate control signals C and D is shown and described with respect to FIG. 2. The control signal D can be generated using a first AND gate 104 by (B AND A'), and the control signal C can be generated using a second AND gate 106 by (A AND B').

As described in detail below, the control circuit 102 can control operation of the first switching converter circuit ($Q_3$, $Q_4$, $L_1$) using a first timing phase ($\phi$1) and control operation of the second switching converter circuit ($Q_7$, $Q_8$, $L_2$) using a second timing phase ($\phi$2). As such, the hybrid converter 100 of FIG. 1 is a "dual-phase" hybrid converter.

In some examples, the dual-phase hybrid converter circuit 100 can include a first capacitor $C_{mid1}$ coupled between a first node MID1 between the second switching element $Q_2$ and the third switching element $Q_3$ and a reference voltage node, such as a ground node. Similarly, the dual-phase hybrid converter circuit 100 can include a second capacitor $C_{mid2}$ coupled between a second node MID2 between the sixth switching element $Q_6$ and the seventh switching element $Q_7$ and the reference voltage node.

Including the first capacitor $C_{mid1}$ and the second capacitor $C_{mid2}$ can be advantageous. For example, the capacitors $C_{mid1}$, $C_{mid2}$ can reduce the parasitic inductance from a long hot loop in the design. Shortening the hot loop and reducing the parasitic inductance can also reduce ringing at high frequencies. In addition, the inclusion of the capacitors $C_{mid1}$, $C_{mid2}$ can ensure that the voltage stress of switching elements $Q_2$, $Q_3$, $Q_6$, and $Q_7$ is Vin/2.

As mentioned above, the flying capacitors $C_{fly1}$ and $C_{fly2}$ can be cross-coupled. By cross-coupling the flying capacitors, a voltage does not need to be shared between the two power stages P1, P2. That is, the first node MID1 between the second switching element $Q_2$ and the third switching element $Q_3$ and the second node MID2 between the sixth switching element $Q_6$ and the seventh switching element $Q_7$ do not need to be connected. By eliminating the connection, the efficiency of the dual-phase hybrid converter 100 can be increased because there is no DC current flowing back and forth between the two power stages P1, P2.

FIG. 2 is a schematic diagram of an example of control logic circuitry for the dual-phase hybrid converter of FIG. 1. As shown in the example of FIG. 2, control signal C can be generated using a first AND gate 104 by (A' AND B), and control signal D can be generated using a second AND gate 106 by (A AND B').

In this manner, the control logic circuitry of FIG. 2 can generate a third control signal (C) using one of the complementary first control signals (A') and one of the complementary second control signals (B). The control signal C can control operation of the second switched-capacitor circuit ($Q_5$, $Q_6$, $C_{fly1}$).

Similarly, the control logic circuitry of FIG. 2 can generate another third control signal (D) using the other of the complementary first control signals (A) and the other of the complementary second control signals (B'). The control signal D can control operation of the first switched-capacitor circuit ($Q_1$, $Q_2$, $C_{fly2}$).

In some examples, the first and second AND gates 104, 106 can form part of the control circuit 102 of FIG. 1.

Figure 3:
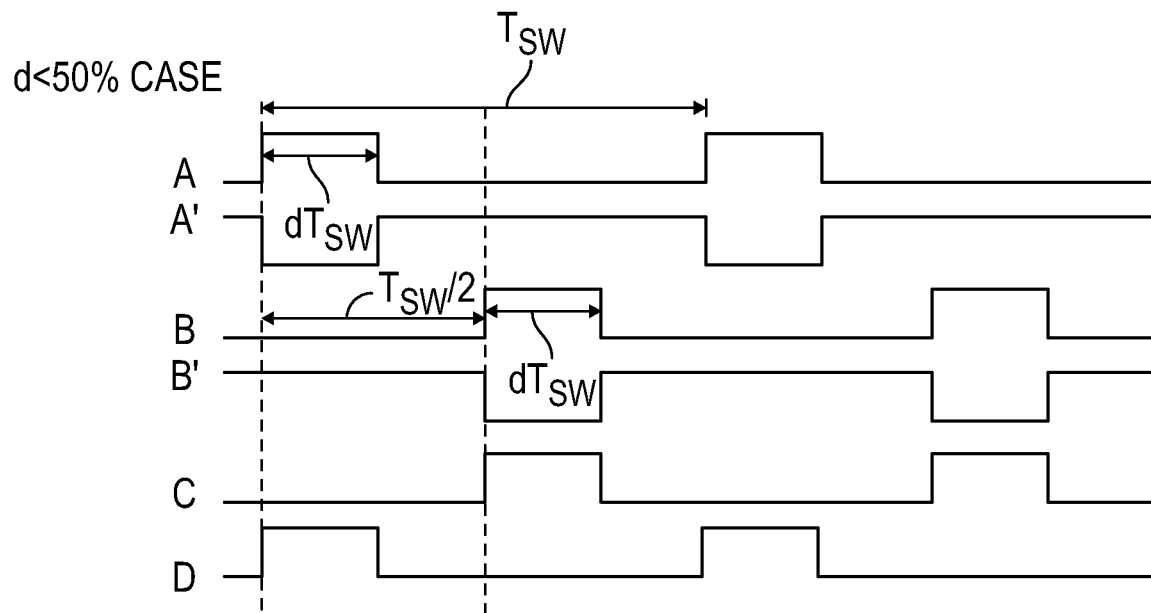
FIG. 3 is an example of a timing diagram of the control signals of the dual-phase hybrid converter in FIG. 1.

FIG. 3 is an example of a timing diagram of the control signals of the dual-phase hybrid converter in FIG. 1 where the duty cycle is less than 50%. The switching period is $T_{SW}$ and includes $D*T_{SW}$ ($\phi$2) and $(1-D*T_{SW})$ ($\phi$1), where D is the duty cycle and * represents the mathematical operate for multiplication. The time $(1-D*T_{SW})$ can represent a first timing phase $\phi$1 (shown as complementary control signals B, B') and the time $D*T_{SW}$ can represent a second timing phase $\phi$2 (shown as control signals complementary A, A'). As seen in the example of FIG. 3, the first timing phase $\phi$1 (specifically control signal B) and the second timing phase $\phi$2 (specifically control signal A) do not overlap with one another. A control circuit, such as the control circuit 102 of FIG. 1, can generate the first and second timing phases according to a switching cycle having a switching frequency and a duty cycle, where the duty cycle is less than 50%.

In some non-limiting examples, the control signals A and B can be 180 degrees out of phase, such as by setting the time between a rising edge of a logic high of the A control signal and a rising edge of a logic high of the B control signal at half the switching period, or $T_{SW}/2$.

Figure 4:
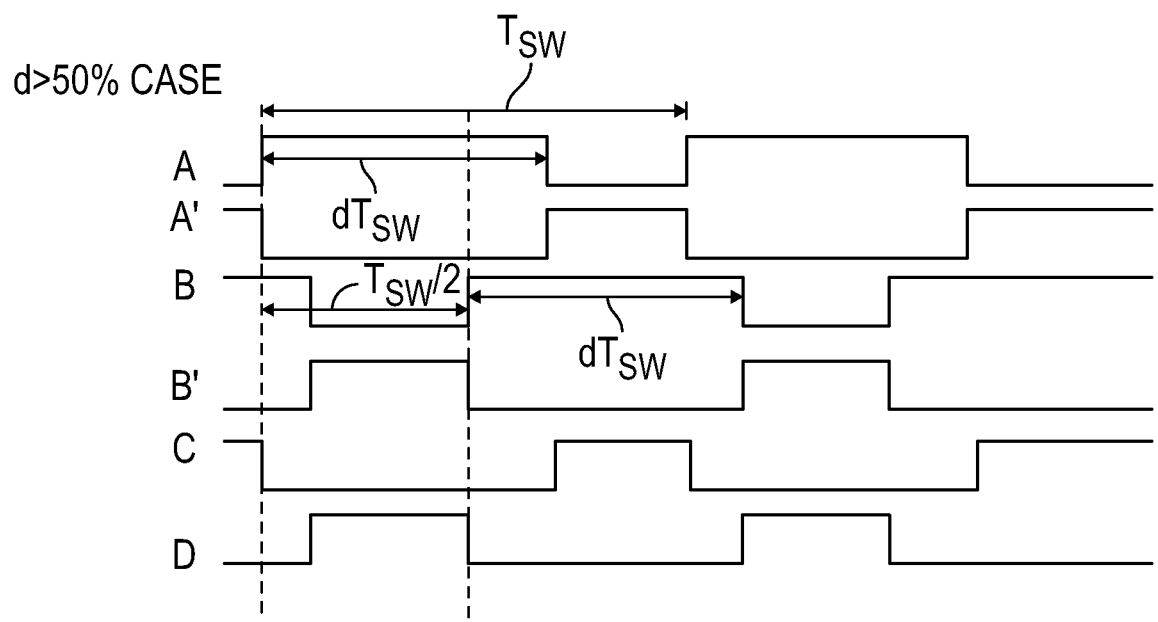
FIG. 4 is another example of a timing diagram of the control signals of the dual-phase hybrid converter in FIG. 1.

FIG. 4 is another example of a timing diagram of the control signals of the dual-phase hybrid converter in FIG. 1 where the duty cycle is greater than 50%. The switching period is $T_{SW}$ and includes $D*T_{SW}$ ($\phi$2) and $(1-D*T_{SW})$ ($\phi$1), where D is the duty cycle and * represents the mathematical operate for multiplication. The time $(1-D*T_{SW})$ can represent a first timing phase $\phi$1 (shown as complementary control signals B, B'), and the time $D*T_{SW}$ can represent a second timing phase $\phi$2 (shown as complementary control signals A, A'). As seen in the example of FIG. 4, the first timing phase $\phi$1 (specifically control signal B) and the second timing phase $\phi$2 (specifically control signal A) can overlap with one another. A control circuit, such as the control circuit 102 of FIG. 1, can generate the first and second timing phases according to a switching cycle having a switching frequency and a duty cycle, where the duty cycle is greater than 50%.

The control circuit, such as the control circuit 102 of FIG. 1, can generate controls signals, such as shown in FIG. 3 or FIG. 4, and apply, according to a switching cycle having a switching frequency and a duty cycle, the complementary first control signals, the complementary second control signals, and the complementary third control signals, where the switching cycle includes the first timing phase $\phi$1) and the second timing phase ($\phi$2). In response, the first switching converter circuit, the second switching converter circuit, the first switched-capacitor circuit, and the second switched-capacitor circuit can generate a series of pulses to at least one LC circuit including at least one capacitor, e.g., the output capacitor $C_{OUT}$ or the input capacitor $C_{IN}$ of FIG. 11, and at least one inductor, e.g., at least one of the inductors $L_1$, $L_2$.

The control circuit can then adjust the duty cycle of the switching signals, specifically control signals A and B, to adjust the series of pulses to set an output voltage across an output capacitor at a predefined and essentially constant amplitude. The dual-phase hybrid converter can then provide the output voltage across the output capacitor $C_{OUT}$ as an output voltage of the dual-phase hybrid converter. If the output capacitor $C_{OUT}$ is part of the LC circuit, such as in FIG. 1, then the configuration is a buck converter where the output voltage is less than the input voltage. If, however, the capacitor is not part of the LC circuit, such as the output capacitor $C_{OUT}$ in FIG. 11, then the configuration is a boost converter where the output voltage is greater than the input voltage.

In some non-limiting examples, the control signals A and B can be 180 degrees out of phase, such as by setting the time between a rising edge of a logic high of the A control signal and a rising edge of a logic high of the B control signal at half the switching period, or $T_{SW}/2$.

Figures 5A, 5B, 5C:
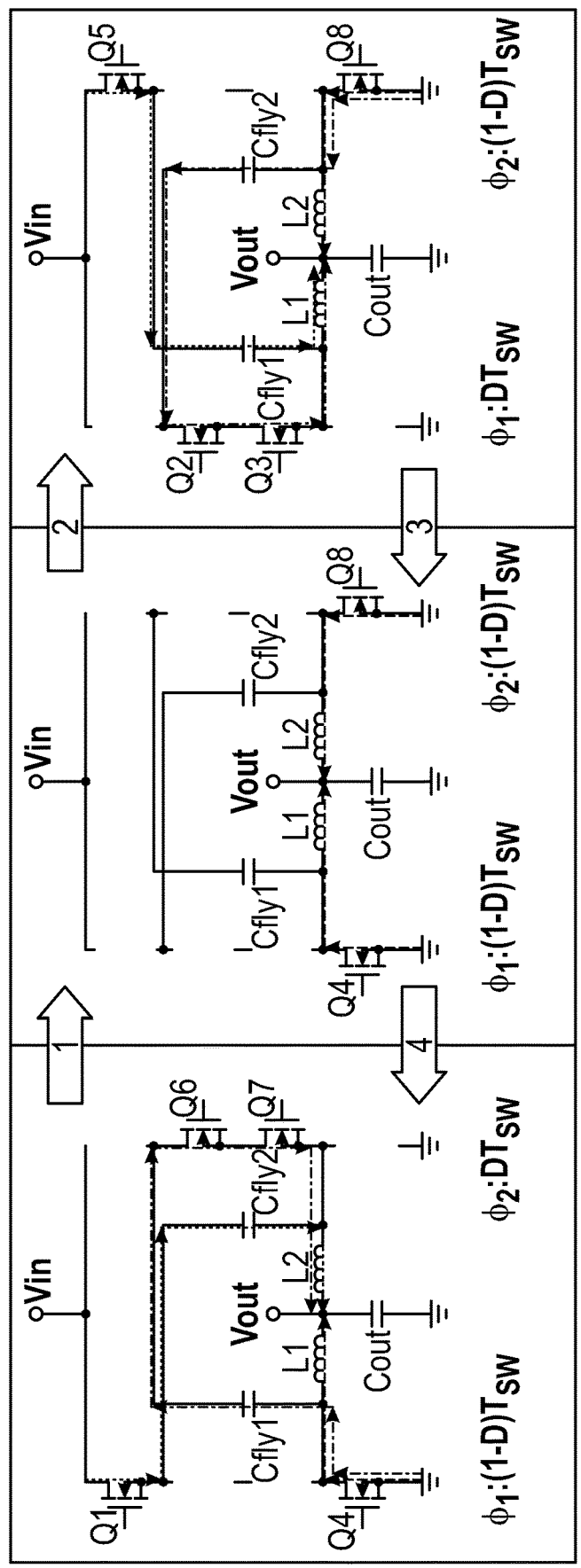
FIG. 5A is a schematic diagram of an example of a first operating phase of the dual-phase hybrid converter of FIG. 1 for a duty cycle less than 50%.
FIG. 5B is a schematic diagram of an example of a second operating phase of the dual-phase hybrid converter of FIG. 1 for a duty cycle less than 50%.
FIG. 5C is a schematic diagram of an example of a third operating phase of the dual-phase hybrid converter of FIG. 1 for a duty cycle less than 50%.

FIG. 5A is a schematic diagram of an example of a first operating phase of the dual-phase hybrid converter of FIG. 1 for a duty cycle less than 50%. The control circuit, such as the control circuit 102 of FIG. 1 can output various control signals to turn ON and OFF various switching elements of FIGS. 5A-5C. The switching elements $Q_1$, $Q_4$, $Q_6$, and $Q_7$ are turned ON and the switching elements $Q_2$, $Q_3$, $Q_5$, and $Q_8$ are turned OFF. The capacitor $C_{fly1}$ is coupled to ground and supplies half of the inductor current to the inductor $L_2$. The control circuit turns the switching element $Q_1$ ON and the input voltage $V_{IN}$ charges the capacitor $C_{fly2}$ and supplies the other half of the inductor current to the inductor $L_2$. The inductor $L_1$ is freewheeling. Additionally, the current through inductor $L_1$ ramps down while the current through inductor $L_2$ ramps up. The first timing phase φ1 is represented by $(1-D*T_{SW})$ and the second timing phase φ2 is represented by $D*T_{SW}$ in the first operating phase of FIG. 5A.

FIG. 5B is a schematic diagram of an example of a second operating phase of the dual-phase hybrid converter of FIG. 1 for a duty cycle less than 50%. The switching elements $Q_4$ and $Q_8$ are turned ON and the switching elements $Q_1$-$Q_3$ and $Q_5$-$Q_7$ are turned OFF. Both the inductor $L_1$ and the inductor $L_2$ are freewheeling. The first timing phase φ1 is represented by $(1-D*T_{SW})$ and the second timing phase φ2 is also represented by $(1-D*T_{SW})$ in the second operating phase of FIG. 5B.

FIG. 5C is a schematic diagram of an example of a third operating phase of the dual-phase hybrid converter of FIG. 1 for a duty cycle less than 50%. The switching elements $Q_2$, $Q_3$, $Q_5$, and $Q_8$ are turned ON and the switching elements $Q_1$, $Q_4$, $Q_6$, and $Q_7$ are turned OFF. The capacitor $C_{fly2}$ is coupled to ground and supplies half of the inductor current to the inductor $L_1$. The control circuit turns ON the switching element $Q_5$ and the input voltage VIN charges the capacitor $C_{fly1}$ and supplies the other half of the inductor current to the inductor $L_1$. The inductor $L_2$ is freewheeling. The first timing phase (φ1 is represented by $D*T_{SW}$ and the second timing phase φ2 is represented by $(1-D*T_{SW})$ in the third operating phase of FIG. 5C.

Once the third operating phase is complete, the operation cycles back to the second operating phase of FIG. 5B and then to the first operating phase of FIG. 5A, where the operation begins again. During the operation, the switching element $Q_7$ follows the switching element $Q_1$, the switching element $Q_2$ follows the switching element $Q_8$, the switching element $Q_3$ follows the switching element $Q_5$, and the switching element $Q_6$ follows the switching element $Q_4$. Both flying capacitors are charged and discharged through an inductor.

FIGS. 12A-12D depict an alternative example operating phases of the dual-phase hybrid converter of FIG. 1 for a duty cycle less than 50%, as described in detail below.

FIG. 6A is a schematic diagram of an example of a first operating phase of the dual-phase hybrid converter of FIG. 1 for a duty cycle greater than 50%. The control circuit, such as the control circuit 102 of FIG. 1 can output various control signals to turn ON and OFF various switching elements of FIGS. 6A-6C. The switching elements $Q_1$, $Q_4$, $Q_6$, and $Q_7$ are turned ON and the switching elements $Q_2$, $Q_3$, $Q_5$, and $Q_8$ are turned OFF. The operation in FIG. 6A is similar to the operation in FIG. 5A. The capacitor $C_{fly1}$ is coupled to ground and supplies half of the inductor current to the inductor $L_2$. The control circuit turns ON the switching element $Q_1$ and the input voltage VIN charges the capacitor $C_{fly2}$ and supplies the other half of the inductor current to the inductor $L_2$. The inductor $L_1$ is freewheeling. The first timing phase 41 is represented by $(1-D*T_{SW})$ and the second timing phase φ2 is represented by $D''T_{SW}$ in the first operating phase of FIG. 6A.

FIG. 6B is a schematic diagram of an example of a second operating phase of the dual-phase hybrid converter of FIG. 1 for a duty cycle greater than 50%. The control circuit, e.g., the control circuit 102 of FIG. 1, can turn the switching elements $Q_1$, $Q_5$ ON at the same time. To prevent any cross-conduction, the control circuit can turn OFF the switching elements $Q_2$, $Q_6$. In some examples, the switching elements $Q_3$, $Q_7$ can be ON, such as shown in FIG. 6B. In other examples, the switching elements $Q_3$, $Q_7$ can be OFF.

When the switching element $Q_1$ turns ON, the inductor $L_2$ is charged through the capacitor $C_{fly2}$. Similarly, when the switching element $Q_5$ turns ON, the inductor $L_1$ is charged through the capacitor $C_{fly1}$. The first timing phase φ1 is represented by $D*T_{SW}$ and the second timing phase φ2 is also represented by $(D*T_{SW})$ in the second operating phase of FIG. 6B. As such, the first timing phase φ1 and the second timing phase φ2 overlap.

FIG. 6C is a schematic diagram of an example of a third operating phase of the dual-phase hybrid converter of FIG. 1 for a duty cycle greater than 50%. The switching elements $Q_2$, $Q_3$, $Q_5$, and $Q_8$ are ON and the switching elements $Q_1$, $Q_4$, $Q_6$, and $Q_7$ are OFF The operation in FIG. 6C is similar to the operation in FIG. 5C. The capacitor $C_{fly2}$ is coupled to ground and supplies half of the inductor current to the inductor $L_1$. The control circuit turns ON the switching element 5 and the input voltage VIN charges the capacitor $C_{fly1}$ and supplies the other half of the inductor current to the inductor $L_1$. The inductor $L_2$ is freewheeling. The first timing phase φ1 is represented by $D*T_{SW}$ and the second timing phase φ2 is represented by $(1-D*T_{SW})$ in the third operating phase of FIG. 6C.

Once the third operating phase is complete, the operation cycles back to the second operating phase of FIG. 6B and then to the first operating phase of FIG. 6A, where the operation begins again. During the operation, the switching element $Q_6$ follows the switching elements $Q_1$, $Q_4$, and the switching element $Q_2$ follows the switching elements $Q_5$, $Q_8$. This operation can widen the input voltage range, which can allow for more greater fluctuations of the input voltage.

Figure 7:
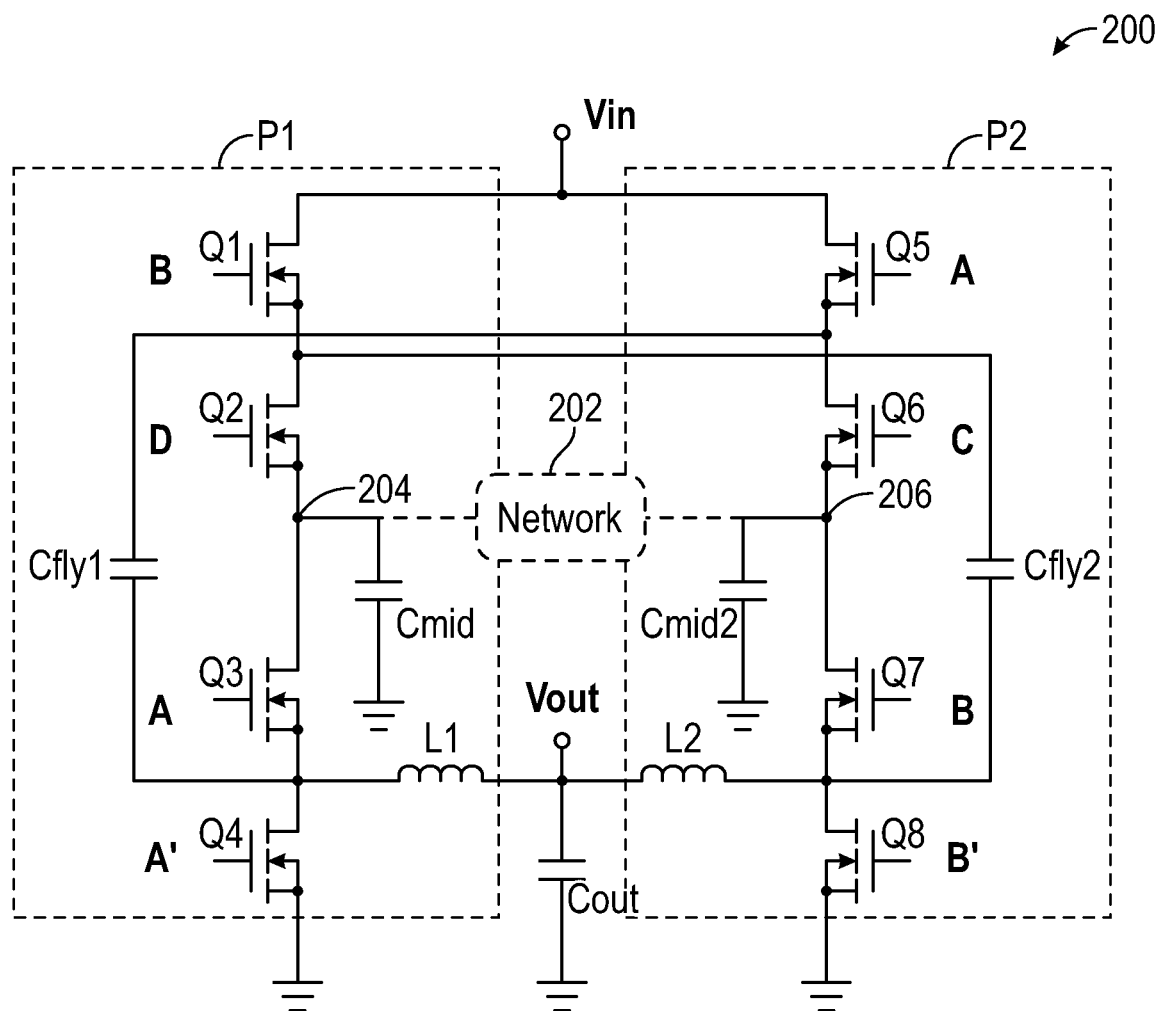
FIG. 7 is a schematic diagram of another example of a dual-phase hybrid converter.

FIG. 7 is a schematic diagram of another example of a dual-phase hybrid converter. In some examples, the dual-phase hybrid converter 200 can include a network circuit 202 coupled between a midpoint node 204 of the first half power stage P1 and a midpoint node 206 of the second half power stage P2. The midpoint node 204 is between the second switching element $Q_2$ and the third switching element $Q_3$ and the midpoint node 206 is between the sixth switching element $Q_6$ and the seventh switching element $Q_7$.

The network circuit 202 can include at least one of an electrical short (e.g., a low impedance element that directly connects the two nodes), a resistive element, a capacitive element, or an inductive element. For example, the network circuit 202 can include a resistor, a capacitor, or an inductor. As another example, the network circuit 202 can include a resistor and a capacitor, a resistor and an inductor, or a capacitor and an inductor. As another example, the network circuit 202 can include a resistor, a capacitor, and an inductor.

Including a network circuit can be advantageous if during a transient there is a mismatch between the two flying capacitors. In addition, if there is a difference in voltage between the two flying capacitors, the network circuit can match it.

Figure 8:
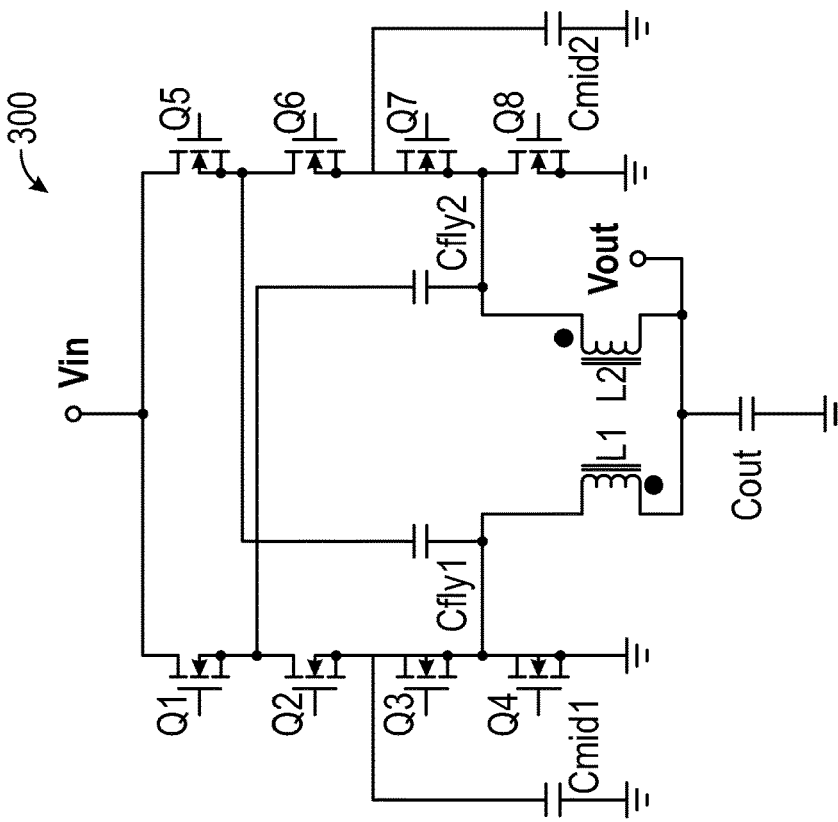
FIG. 8 is a schematic diagram of another example of a dual-phase hybrid convener.

FIG. 8 is a schematic diagram of another example of a dual-phase hybrid converter. The inductors $L_1$ and $L_2$ of the dual-phase hybrid converter 300 of FIG. 8 can be a coupled inductor, in contrast to being separate inductors like in FIG. 1. Using a coupled inductor can result in a smaller size and higher efficiency.

Figure 9:
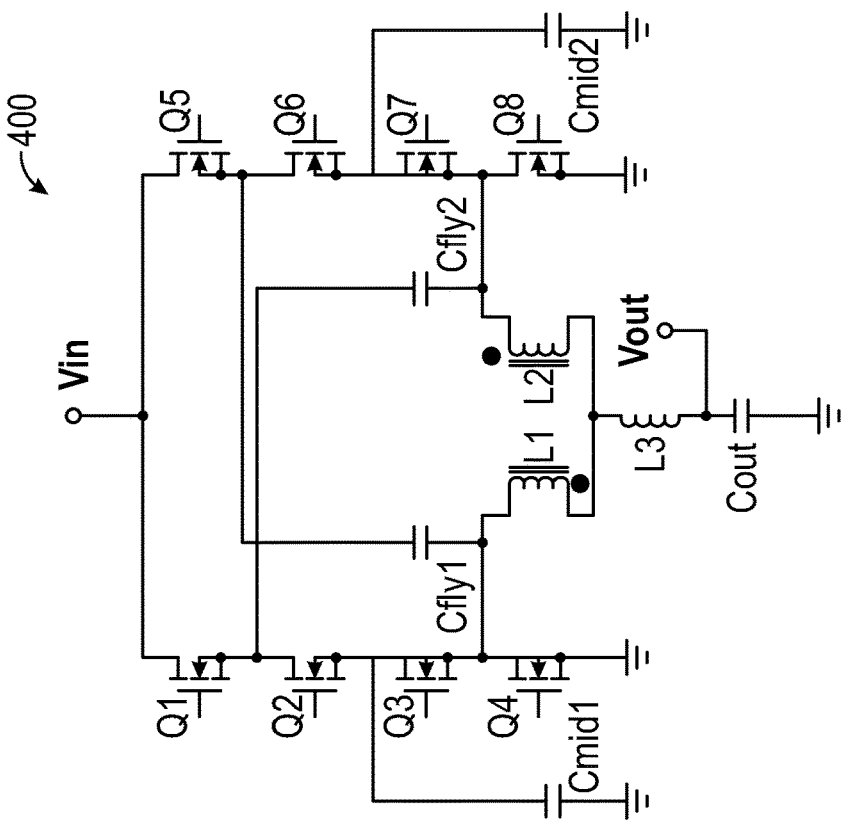
FIG. 9 is a schematic diagram of another example of a dual-phase hybrid converter.

FIG. 9 is a schematic diagram of another example of a dual-phase hybrid converter. The inductors $L_1$ and $L_2$ of the dual-phase hybrid converter 300 of FIG. 8 can be a transformer, in contrast to being separate inductors like in FIG. 1. In addition, the dual-phase hybrid converter 300 can include a small inductor $L_3$ coupled between the transformer formed by $L_1$ and $L_2$ and the output capacitor $C_{OUT}$. Using a transformer can result in a smaller size and higher efficiency.

Figure 10:
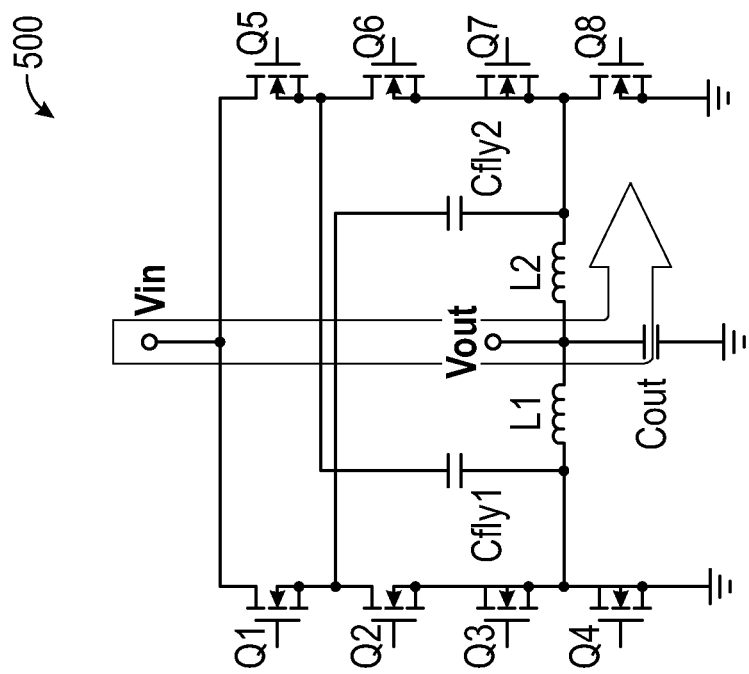
FIG. 10 is a schematic diagram of the dual-phase hybrid converter of FIG. 1 coupled as a buck converter.

FIG. 10 is a schematic diagram of the dual-phase hybrid converter of FIG. 1 coupled as a buck converter. The dual-phase hybrid converter 500 of FIG. 10 can receive an input voltage $V_{IN}$ at a node between the first switching element $Q_1$ and the fifth switching element $Q_5$ and generate an output voltage $V_{OUT}$ that is less than an input voltage at a node between the first inductor $L_1$ and the second inductor $L_2$.

Figure 11:
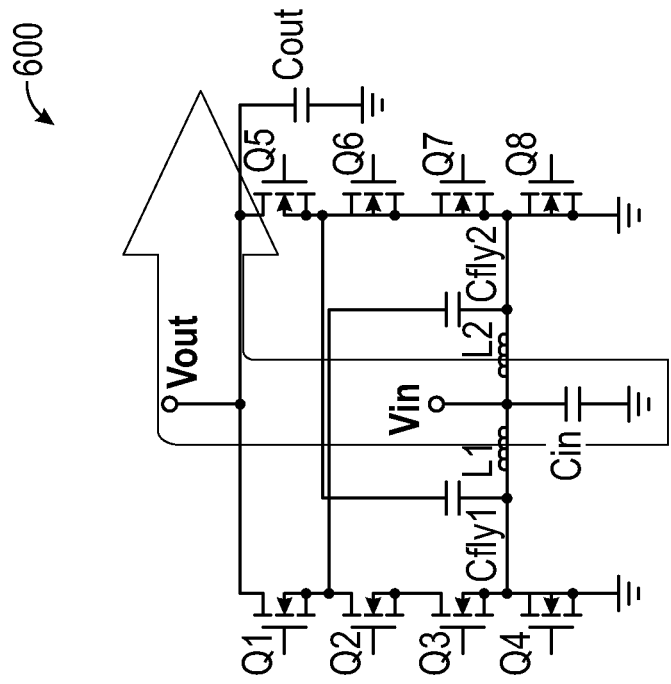
FIG. 11 is a schematic diagram of the dual-phase hybrid convener of FIG. 1 coupled as a boost converter.

FIG. 11 is a schematic diagram of the dual-phase hybrid converter of FIG. 1 coupled as a boost converter. The dual-phase hybrid converter 600 of FIG. 10 can receive an input voltage $V_{IN}$ at a node between the first inductor $L_1$ and the second inductor L2 and generate an output voltage $V_{OUT}$ that is greater than an input voltage at a node between the first switching element $Q_1$ and the fifth switching element $Q_5$.

Figures 12A, 12B, 12C, 12D:
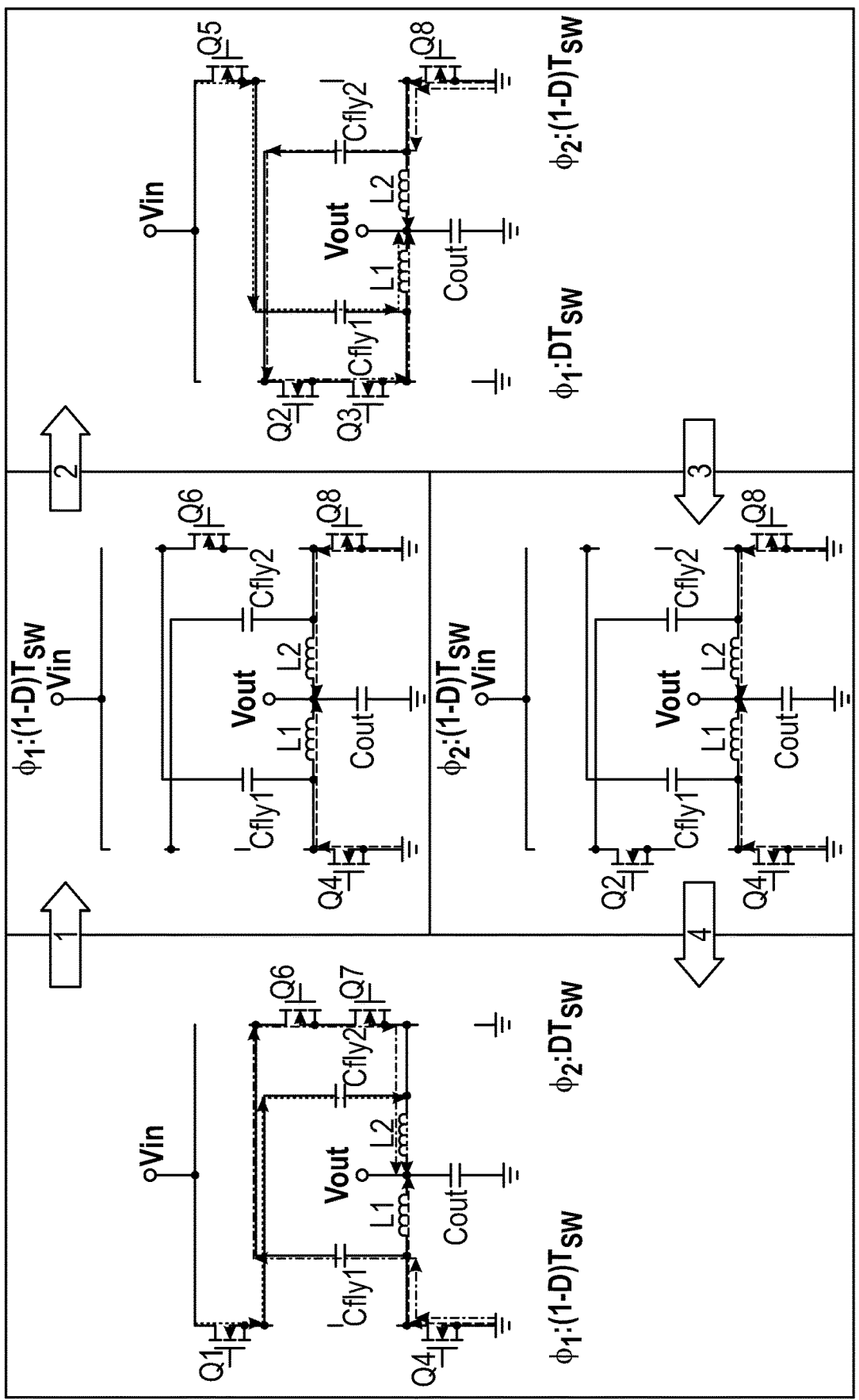
FIG. 12A is a schematic diagram of another example of a first operating phase of the dual-phase hybrid converter of FIG. 1 for a duty cycle less than 50%.
FIG. 12B is a schematic diagram of another example of a second operating phase of the dual-phase hybrid converter of FIG. 1 for a duty cycle less than 50%.
FIG. 12C is a schematic diagram of another example of a third operating phase of the dual-phase hybrid converter of FIG. 1 for a duty cycle less than 50%.
FIG. 12D is a schematic diagram of another example of a fourth operating phase of the dual-phase hybrid converter of FIG. 1 for a duty cycle less than 50%.

FIG. 12A is a schematic diagram of another example of a first operating phase of the dual-phase hybrid converter of FIG. 1 for a duty cycle less than 50%. The control circuit, such as the control circuit 102 of FIG. 1 can output various control signals to turn ON and OFF various switching elements of FIGS. 5A-5C. The switching elements $Q_1$, $Q_4$, $Q_6$, and $Q_7$ are turned ON and the switching elements $Q_2$, $Q_3$, $Q_5$, and $Q_8$ are turned OFF. The capacitor $C_{fly1}$ is coupled to ground and supplies half of the inductor current to the inductor $L_2$. The control circuit turns the switching element $Q_1$ ON and the input voltage VIN charges the capacitor $C_{fly2}$ and supplies the other half of the inductor current to the inductor $L_2$. The inductor $L_1$ is freewheeling. Additionally, the current through inductor $L_1$ ramps down while the current through inductor $L_2$ ramps up. The first timing phase ϕ1 is represented by $(1-D*T_{SW})$ and the second timing phase ϕ2 is represented by $D*T_{SW}$ in the first operating phase of FIG. 12A.

FIG. 12B is a schematic diagram of an example of a second operating phase of the dual-phase hybrid converter of FIG. 1 for a duty cycle less than 50%. The switching elements $Q_4$ and $Q_8$ are turned ON and the switching elements $Q_1$-$Q_3$ and $Q_5$ and $Q_7$ are turned OFF. The switching element $Q_6$ is turned ON and can remain ON until the switching element $Q_5$ turns on in the third operating phase of FIG. 12C. Turning the switching element $Q_6$ ON can improve the voltage balancing between the capacitor $C_{fly1}$ and the capacitors $C_{mid1}$, $C_{mid2}$; especially for low duty cycles. Both the inductor $L_1$ and the inductor $L_2$ are freewheeling. The first timing phase ϕ1 is represented by $(1-D*T_{SW})$ and the second timing phase ϕ2 is also represented by $(1-D*T_{SW})$ in the second operating phase of FIG. 12B.

FIG. 12C is a schematic diagram of another example of a third operating phase of the dual-phase hybrid converter of FIG. 1 for a duty cycle less than 50%. The switching elements $Q_2$, $Q_3$, $Q_5$, and $Q_8$ are turned ON and the switching elements $Q_1$, $Q_4$, $Q_6$, and $Q_7$ are turned OFF. The capacitor $C_{fly2}$ is coupled to ground and supplies half of the inductor current to the inductor $L_1$. The control circuit turns ON the switching element $Q_5$ and the input voltage VIN charges the capacitor $C_{fly1}$ and supplies the other half of the inductor current to the inductor $L_1$. The inductor $L_2$ is freewheeling. The first timing phase ϕ1 is represented by $D*T_{SW}$ and the second timing phase ϕ2 is represented by $(1-D*T_{SW})$ in the third operating phase of FIG. 12C.

FIG. 12D is a schematic diagram of an example of a fourth operating phase of the dual-phase hybrid converter of FIG. 1 for a duty cycle less than 50%. The switching elements $Q_4$ and $Q_8$ are turned ON and the switching elements $Q_1$-$Q_3$ and $Q_5$ and $Q_7$ are turned OFF, The switching element $Q_2$ is turned ON and can remain ON until the switching element $Q_1$ turns on in the first operating phase of FIG. 12A. Turning the switching element $Q_2$ ON can improve the voltage balancing between the capacitor $C_{fly2}$ and the capacitors $C_{mid1}$, $C_{mid2}$, especially for low duty cycles. Both the inductor $L_1$ and the inductor $L_2$ are freewheeling. The first timing phase ϕ1 is represented by $(1-D*T_{SW})$ and the second timing phase ϕ2 is also represented by $(1-D*T_{SW})$ in the second operating phase of FIG. 12B.

Once the fourth operating phase is complete, the operation cycles back to the first operating phase of FIG. 12A, where the operation begins again. During the operation, the switching element $Q_7$ follows the switching element $Q_1$, the switching element $Q_2$ follows the switching element $Q_8$, the switching element $Q_3$ follows the switching element $Q_5$, and the switching element $Q_6$ follows the switching element $Q_4$. Both flying capacitors are charged and discharged through an inductor.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAM), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

The invention claimed is:

1. A dual-phase hybrid converter comprising:
    a first switched-capacitor circuit including a first switching element, a second switching element, and a first capacitor;
    a first switching converter circuit including a third switching element, a fourth switching element, and a first inductor, wherein the second switching element is coupled with the third switching element;
    a second switched-capacitor circuit including a fifth switching element, a sixth switching element, and a second capacitor;
    a second switching converter circuit including a seventh switching element, an eighth switching element, and a second inductor, wherein the sixth switching element is coupled with the seventh switching element; and
    a control circuit to control operation of the first switching converter circuit using a first timing phase and control operation of the second switching converter circuit using a second timing phase, wherein the first timing phase includes complementary first control signals, and wherein the second timing phase includes complementary second control signals,
    wherein the first capacitor is connected between the second switched-capacitor circuit and the first switching converter circuit, and
    wherein the second capacitor is connected between the first switched-capacitor circuit and the second switching converter circuit,
    the control circuit to:
        control operation of the first switched capacitor circuit and the second switched capacitor circuit using third control signals; and
        generate one of the third control signals using one of the complementary first control signals and one of the complementary second control signals.

2. The dual-phase hybrid converter of claim 1, the control circuit including:
    a first logic circuit to generate a first one of the third control signals using a first one of the complementary first control signals and a second one of the complementary second control signals; and
    a second logic circuit to generate a second one of the third control signals using a second one of the complementary first control signals and a first one of the complementary second control signals.

3. The dual-phase hybrid converter of claim 1, comprising:
    a third capacitor coupled between a reference voltage node and a first node between the second switching element and the third switching element; and
    a fourth capacitor coupled between the reference voltage node and a second node that is between the sixth switching element and the seventh switching element.

4. The dual-phase hybrid converter of claim 3, comprising:
    a network circuit coupled between the first node and the second node.

5. The dual-phase hybrid converter of claim 4, the network circuit including:
    at least one of an electrical short, a resistive element, a capacitive element, or an inductive element.

6. The dual-phase hybrid converter of claim 1, the dual-phase hybrid converter to generate an output voltage that is less than an input voltage.

7. The dual-phase hybrid converter of claim 1, the dual-phase hybrid converter to generate an output voltage that is greater than an input voltage.

8. The dual-phase hybrid converter of claim 1, the control circuit to generate the first timing phase and the second timing phase according to a switching cycle having a switching frequency and a duty cycle, wherein the duty cycle is less than 50%.

9. The dual-phase hybrid converter of claim 1, the control circuit to generate the first timing phase and the second timing phase according to a switching cycle having a switching frequency and a duty cycle, wherein the duty cycle is greater than 50%, and wherein the first timing phase and the second timing phase overlap with one another.

10. The dual-phase hybrid converter of claim 1, wherein the first inductor and the second inductor form a coupled inductor.

11. The dual-phase hybrid converter of claim 1, wherein the first inductor and the second inductor form a transformer.

12. A method of operating a dual-phase hybrid converter, the method comprising:
generating complementary first control signals to turn ON and OFF switching elements of a first switching converter circuit, wherein a first timing phase includes the complementary first control signals;
generating complementary second control signals to turn ON and OFF switching elements of a second switching converter circuit, wherein a second timing phase includes the complementary second control signals;
generating, using one of the complementary first control signals and one of the complementary second control signals, third control signals to turn ON and OFF switching elements of a first switched-capacitor circuit and a second switched capacitor circuit;
applying, according to a switching cycle having a switching frequency and a duty cycle, the complementary first control signals, the complementary second control signals, and the third control signals, the switching cycle including the first timing phase and the second timing phase;
generating a series of pulses by the first switching converter circuit, the second switching converter circuit, the first switched-capacitor circuit, and the second switched-capacitor circuit, to at least one LC circuit including at least one of an output capacitor and an input capacitor and at least one inductor;
adjusting the duty cycle of switching signals to adjust the series of pulses to set an output voltage across an output capacitor; and
providing the output voltage across the output capacitor as an output voltage of the dual-phase hybrid converter.

13. The method of claim 12, wherein providing the output voltage across the output capacitor as the output voltage of the dual-phase hybrid converter includes:
providing the output voltage across the output capacitor, wherein the output capacitor forms part of the at least one LC circuit.

14. The method of claim 12, wherein providing the output voltage across the output capacitor as the output voltage of the dual-phase hybrid converter includes:
providing the output voltage across the output capacitor, wherein the output capacitor does not form part of the at least one LC circuit.

15. The method of claim 12, comprising:
coupling a first capacitor between the second switched-capacitor circuit and the first switching converter circuit; and
coupling a second capacitor between the first switched-capacitor circuit and the second switching converter circuit.

16. The method of claim 12, comprising:
coupling a first capacitor between a reference voltage node and a first node between a second switching element and a third switching element; and
coupling a second capacitor between the reference voltage node between a second node between a sixth switching element and a seventh switching element.

17. The method of claim 12, comprising:
generating the first timing phase and the second timing phase according to a switching cycle having a switching frequency and a duty cycle, wherein the duty cycle is less than 50%.

18. The method of claim 12, comprising:
generating the first timing phase and the second timing phase according to a switching cycle having a switching frequency and a duty cycle, wherein the duty cycle is greater than 50%, and wherein the first timing phase and the second timing phase overlap with one another.

19. A dual-phase hybrid converter comprising:
a first switched-capacitor circuit including a first switching element, a second switching element, and a first capacitor;
a first switching converter circuit including a third switching element, a fourth switching element, and a first inductor, wherein the second switching element is coupled with the third switching element;
a second switched-capacitor circuit including a fifth switching element, a sixth switching element, and a second capacitor;
a second switching converter circuit including a seventh switching element, an eighth switching element, and a second inductor, wherein the sixth switching element is coupled with the seventh switching element; and
a control circuit to control operation of the first switching converter circuit using a first timing phase and control operation of the second switching converter circuit using a second timing phase, the control circuit to:
generate complementary first control signals to turn ON and OFF switching elements of the first switching converter circuit;
generate complementary second control signals to turn ON and OFF switching elements of the second switching converter circuit; and
generate, using one of the complementary first control signals and one of the complementary second control signals, third control signals to turn ON and OFF switching elements of the first switched-capacitor circuit and the second switched-capacitor circuit.

20. The dual-phase hybrid converter of claim 19, wherein the first capacitor is connected between the second switched-capacitor circuit and the first switching converter circuit, and wherein the second capacitor is connected between the first switched-capacitor circuit and the second switching converter circuit.

* * * * *